(12) United States Patent
Brace

(10) Patent No.: US 12,491,025 B2
(45) Date of Patent: Dec. 9, 2025

(54) MICROWAVE ABLATION ANTENNA WITH BIDIRECTIONAL PLANAR TISSUE HEATING

(71) Applicant: Wisconsin Alumni Research Foundation, Madison, WI (US)

(72) Inventor: Christopher Brace, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 328 days.

(21) Appl. No.: 18/225,946

(22) Filed: Jul. 25, 2023

(65) Prior Publication Data
US 2025/0032185 A1 Jan. 30, 2025

(51) Int. Cl.
*A61B 18/18* (2006.01)
*A61B 18/00* (2006.01)

(52) U.S. Cl.
CPC .............. *A61B 18/1815* (2013.01); *A61B 2018/00077* (2013.01); *A61B 2018/00083* (2013.01); *A61B 2018/00107* (2013.01); *A61B 2018/00565* (2013.01); *A61B 2018/00577* (2013.01); *A61B 2018/00767* (2013.01); *A61B 2018/1823* (2013.01); *A61B 2018/183* (2013.01); *A61B 2018/1892* (2013.01)

(58) Field of Classification Search
CPC .......... A61B 2018/00565; A61B 2018/00571; A61B 2018/00577; A61B 18/18; A61B 18/1815; A61B 2018/1823; A61B 2018/183; A61B 2018/1869; A61B 2018/1892

See application file for complete search history.

(56) References Cited

U.S. PATENT DOCUMENTS

| | | | |
|---|---|---|---|
| 10,342,614 B2 | 7/2019 | van der Weide | |
| 2005/0263159 A1* | 12/2005 | Widmann | A61B 18/1492 607/101 |
| 2008/0045938 A1* | 2/2008 | van der Weide | A61B 18/1815 606/33 |
| 2013/0267940 A1* | 10/2013 | Chiang | A61B 18/1815 606/33 |
| 2014/0276743 A1* | 9/2014 | Curley | A61B 18/1815 606/33 |
| 2019/0021793 A1* | 1/2019 | Rossetto | H01Q 1/273 |

\* cited by examiner

*Primary Examiner* — Ronald Hupczey, Jr.
*Assistant Examiner* — Bradford C. Blaise
(74) *Attorney, Agent, or Firm* — Boyle Fredrickson, S.C.

(57) ABSTRACT

An ablation probe employs a triaxial construction with axial slots in an outer pair of tubular conductors separated by different dielectric materials to provide microwave power concentrated along a plane.

15 Claims, 2 Drawing Sheets

MICROWAVE ABLATION ANTENNA WITH BIDIRECTIONAL PLANAR TISSUE HEATING

CROSS REFERENCE TO RELATED APPLICATION

Background of the Invention

The present invention relates to an apparatus and procedure for ablating tissue and, in particular, a microwave ablation probe providing an ablation zone concentrated along a plane.

Leg length discrepancies (LLD) impact 40-70% of the world's population and can result from injury or disease affecting one or more growth plates in the leg such as cause the affected leg to be shorter than the contralateral normal leg. LLD can lead, in later life, to altered gait, joint pain, lumbar disc herniation, chronic lower back pain, and accelerated osteoarthritis of the knee, hip, and lumbar spine.

Current treatments for LLD include limb lengthening procedures for the affected leg or retarding growth of the unaffected leg. Lengthening is typically reserved for the most severe discrepancies (>5 cm) and accordingly children projected to have a leg length discrepancy of 2-5 cm at maturity and are instead recommended for epiphysiodesis, a treatment to arrest growth and control terminal leg length in the unaffected leg.

Epiphysiodesis is currently performed using mechanical disruption of the growth plate of the corresponding bone of the unaffected leg through repeated drilling and curettage. The procedure is generally effective at arresting growth but is subject to procedural complications such as bleeding or infection. Mechanical disruption is also painful and morbid, requiring many weeks of activity modification post-procedure. Angular deformity or incomplete arrest occurs in as many as 10% of cases.

Some studies have demonstrated that the possibility that thermal ablation can be used to arrest bone growth using bipolar radiofrequency (RF) ablation (less than 300 MHz).

SUMMARY OF THE INVENTION

The present invention provides a microwave ablation probe adapted to deliver a bidirectional plane of energy from a compact antenna sized to be inserted into the bone growth plate. The energy pattern conforms well to the planar extent of this bone growth plate and provides a greater heating area than available with RF ablation.

More specifically, in one embodiment, the invention provides a probe for microwave ablation having a first center conductor and a second conductor spaced from and positioned around the first center conductor and including a first and second diametrically opposed slot extending parallel to the first center conductor. A third conductor is spaced from and positioned around the second conductor and includes a third and fourth diametrically opposed slot extending parallel to the first center conductor, the third and fourth diametrically opposed slots radially aligned with the first and second diametrically opposed slots. A first dielectric material provides a first relative permittivity in the volume between the first center conductor and second conductor, and a second dielectric material provides a second relative permittivity different from the first relative permittivity in the volume between the second conductor and the third conductor to produce a microwave emission pattern concentrated along a plane of the slots.

It is thus a feature of at least one embodiment of the invention to provide a microwave probe that can produce a bidirectional planer power deposition when used alone or in combination with other such probes for improved treatment of planar volumes.

The first dielectric material may have a relative permittivity of at least 15% less than the second dielectric material.

It is thus a feature of at least one embodiment of the invention to provide power deposition shaping both by controlling openings in the conductive shields and adjustment of the dielectric materials between shields.

The circumferential extent of the slots in the second conductor and third conductor and the values of the relative permittivity of the first dielectric material and second dielectric material may be selected to provide for a planar emission of microwave energy into surrounding tissue bounded by a height of less than 50% of a bounding width in the plane of the slots an isocontour of 10% of the electric field intensity maximum in the surrounding tissue.

It is thus a feature of at least one embodiment of the invention to provide superior constraint of power deposition in-plane and reduced power deposition out-of-plane.

The first, second, third, and fourth slots may be limited in length to less than 2 centimeters.

It is thus a feature of at least one embodiment of the invention to concentrate the planar power for treatment of a variety of tissue structures.

The third conductor may have an outside diameter of less than 8 mm.

It is thus a feature of at least one embodiment of the invention to provide a probe that is sufficiently small to be inserted into thin structures, such as a bone growth plate.

The probe may include an electrically insulating handle attached to a distal end of the probe in supporting a flexible electrical cable providing an electrical connector for receiving microwave power. The distal end of the probe may include a feature showing an orientation of the slots about a centerline of the probe.

It is thus a feature of at least one embodiment of the invention to provide a clear indication of the plane of power deposition to the user, for example, marked on the handle or through a handle asymmetry for proper alignment of this angle during ablation.

The probe may further include a microwave power supply providing a microwave frequency voltage between the center conductor and second and third conductors of greater than 2 GHz and 10 W.

It is thus a feature of at least one embodiment of the invention to provide an ablation probe using microwave frequencies that are less susceptible to changes in the dielectric properties of the surrounding tissue.

The probe may be used in one example to provide an ablation plane aligned with a bone growth plate.

It is thus a feature of at least one embodiment of the invention to provide an improved method of arresting bone growth.

These particular objects and advantages may apply to only some embodiments falling within the claims and thus do not define the scope of the invention.

DETAILED DESCRIPTION OF THE PREFERRED EMBODIMENT

Figure 1:
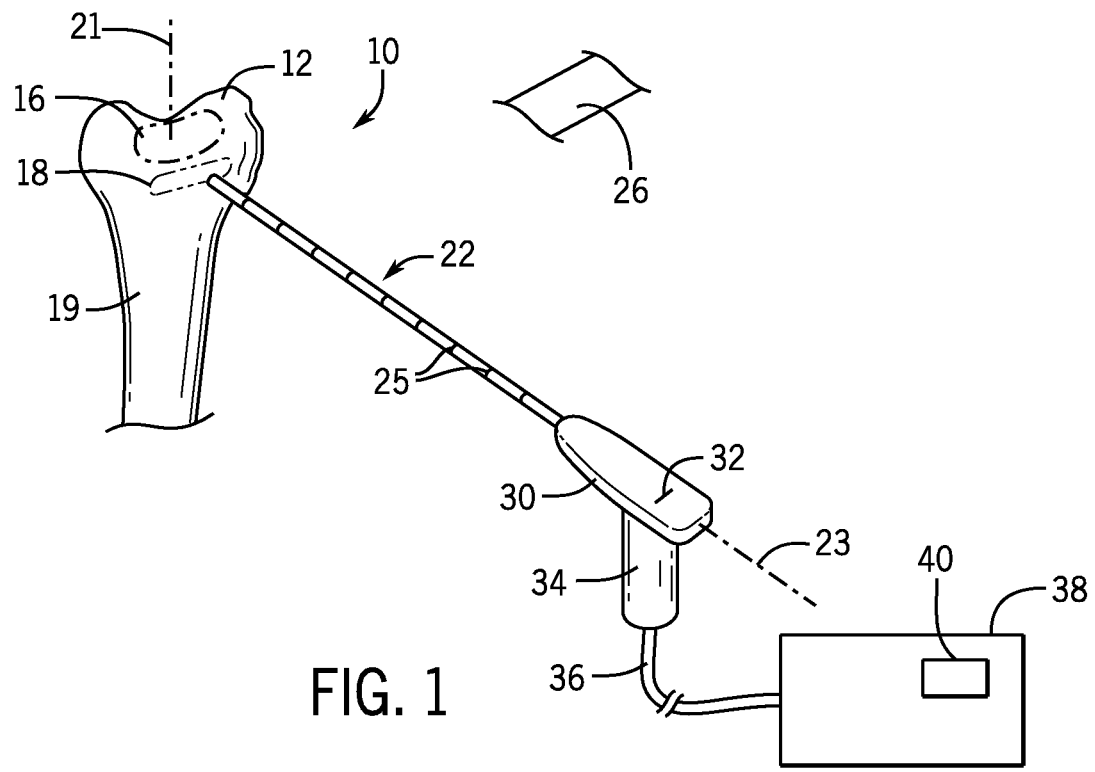
FIG. 1 is a perspective cross-section of a bone showing the growth plate and an insertion of a probe according to the present invention into the growth plate for ablation.

Referring now to FIG. 1, a limb bone 10, such as the tibia, may provide for a hard bone top surface 12 overlying porous bone of the epiphysis 16. The epiphysis is positioned on one side of a growth plate 18 separating the epiphysis from the remainder of the bone shaft 19 extending along the shaft axis 21.

A needle-like microwave probe 22 may be inserted into the growth plate 18 along a transverse plane perpendicular to a shaft axis 21, for example, mediolaterally, to apply microwave heating to the growth plate 18. As will be discussed further below, the microwave probe 22 provides microwave power concentrated within a deposition plane 26 that can be aligned with the transverse plane of the growth plate 18 to thermally ablate this tissue for the purpose of epiphysiodesis. A single or multiple microwave probe 22 and a single or multiple insertion may be employed for this purpose. For insertion, a pilot hole maybe drilled through the growth plate 18 during radio fluoroscopic guidance. A K-wire (not shown) may be then threaded into the pilot hole to insert a hollow sheath (not shown) that is then used to guide the microwave probe 22 after which the sheath is removed.

In some embodiments, the microwave probe 22 generally provides a stiff tubular needle extending along a needle axis 23 circumscribed in cross-section by a diameter less than 8 mm and desirably less than 6 mm to fit within a 6 mm pilot hole. The invention, however, contemplates microwave probes of less than 2 mm for use with 2 mm pilot holes and K-wires and diameters as low as 1 mm. Regularly spaced markings 25 are separated along the axis 23 to provide a measure of depth of insertion.

A handle 30 may be attached to a distal end of the microwave probe 22 (removed from the bone 10) providing an electrically insulating grip for a healthcare provider. The handle 30 may include one or more indicia 32 such as inscribed lines or the asymmetrically protruding handle grip 34 indicating an orientation of the deposition plane 26. A flexible coaxial cable 36 may extend from the handle 34 to a microwave generator 38 to provide electrical continuation of its various elements as will be discussed.

The microwave generator 38 may be of conventional design including a standing wave and/or reflected power meter 40 or the like and outputting as much as 100 watts of microwave power of a frequency of greater than 300 MHz. More generally, frequencies of in excess of 1 GHz and preferably over 2 GHz will be provided and in some cases frequencies in excess of 6-10 GHz being frequencies at which biological tissues preferentially absorb energy more than the coaxial cable dielectrics. In some treatments, powers of 10-65 W may be delivered for 15-90 seconds using a microwave generator operating at 2.45 GHz commercially available from NeuWave Medical of Madison, Wisconsin, under the Certus 140 tradename. Ablation may be conducted for duration of greater than 60 seconds and up to 90 seconds with a duty cycle of less than 50% at 8 GHz in one nonlimiting example.

Figure 2:
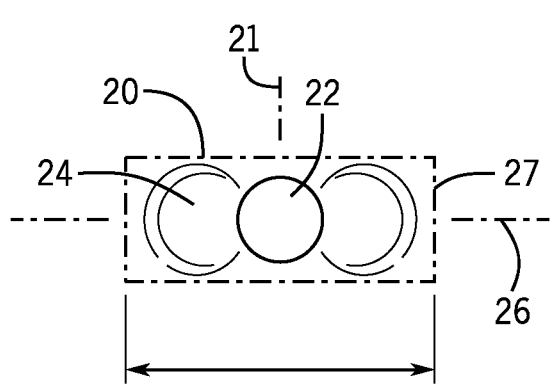
FIG. 2 is a cross-section taken across the axis of the probe of FIG. 1 showing an energy deposition pattern concentrated in a deposition plane as may be produced by the present invention.
Figure 3:
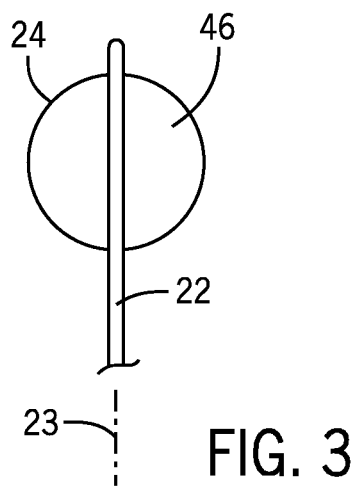
FIG. 3 is a figure similar to that of FIG. 2 showing power deposition perpendicular to the deposition plane such as may be adjusted in area by adjusting probe slots.

Referring now also to FIGS. 2 and 3, as mentioned, the microwave probe 22 is constructed to provide a radiation pattern 24 largely concentrated along a deposition plane 26 coincident with the axis 23 of the probe 22 as illustrated in FIG. 1 and thus alignable with the transverse plane of the growth plate 18. Generally, the microwave probe 22 is designed to provide an isocontour 20 of electric field intensity at 10% of the maximum value in the growth plate tissue to define a radiation pattern 24 that is at least five times as wide (along the deposition plane 26) as tall (perpendicular to the deposition plane 26) measured by its intercept on the deposition plane 26 and a normal to the deposition plane 26. More generally, a rectangular bounding box 27, having sides aligned with the deposition plane 26 and a normal to the deposition plane 26 and circumscribing the above described isocontour 20, will be at least two times as wide as it is tall. The radiation pattern 24 may extend in the anterior-posterior direction along the axial axis 23 by at least 1 cm to provide a radiation area 46 within the deposition plane 26 of approximately equal interior, posterior, and mediolateral dimensions. Generally, these limitations will also describe the power deposition in water.

Figure 4:
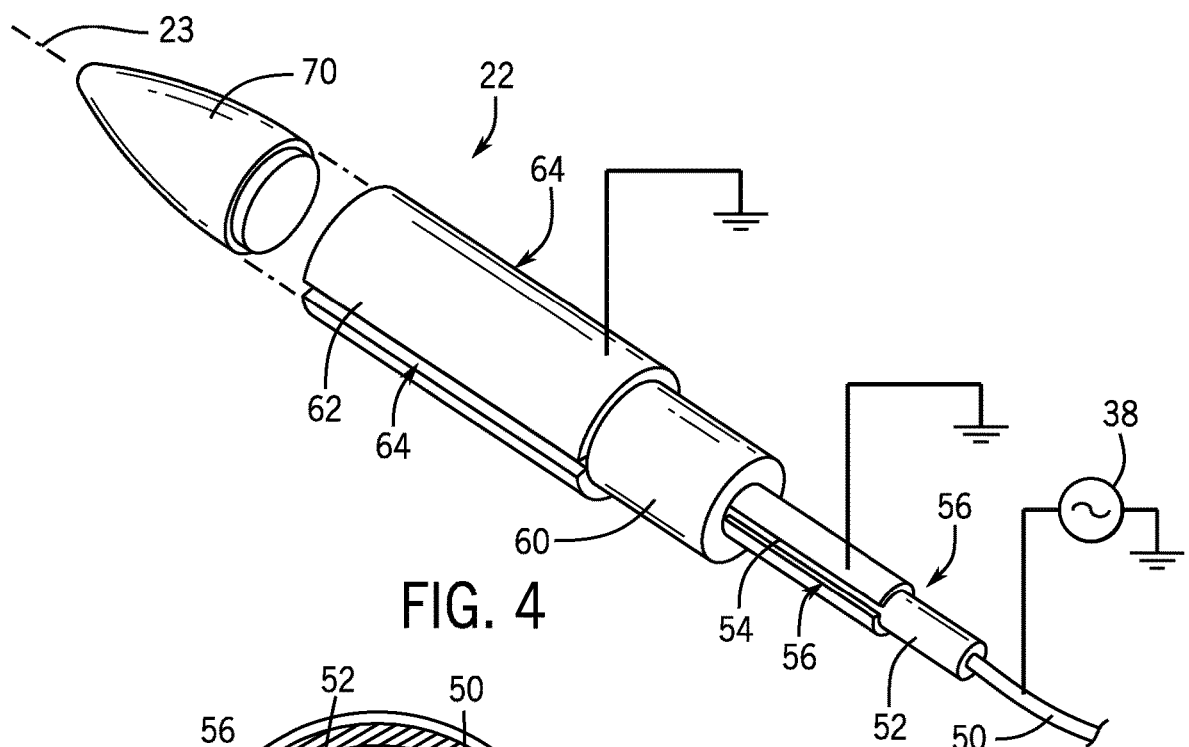
FIG. 4 is a fragmentary perspective view of the probe of FIGS. 1-3 showing the nested dielectric and conductor materials.
Figure 5:
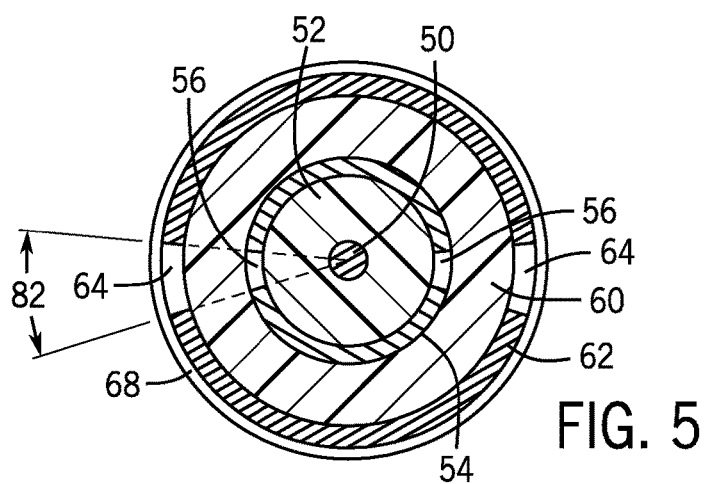
FIG. 5 is a detailed axial cross-section of the probe of FIG. 1 showing the different conductor and dielectric layers and their alignment.

Referring now to FIGS. 4 and 5, the probe 22 may have a triaxial construction providing for a center conductor 50 surrounded by a cylindrical coaxial dielectric material 52. A variety of different dielectric materials can be used as will be discussed, including polymer and ceramic materials, and not necessarily limited to solid materials. In use, the center conductor 50 will be attached to one lead of the microwave generator 38.

A tubular conductor 54 attaches to and surrounds the outer surface of the cylindrical dielectric material 52 while providing diametrically opposed axially extending slots 56 breaking circumferential electrical conduction of the tubular conductor 54 at the slots 56. The tubular conductor 54 may be a machined metal tube or may be a plated metal layer on the dielectric material 52.

The volume within the slots 56 may be filled with a dielectric matching the dielectric material 52; however, this material is generally not critical because of the small volume, and thus other dielectrics may be used.

The tubular conductor 54 is in turn attached to and surrounded by a second dielectric material 60 extending cylindrically continuously around the tubular conductor 54.

The dielectric material 60 is in turn surrounded by a tubular conductor 62 attached to and surrounding the outer surface of the cylindrical dielectric material 60. Like tubular conductor 54, tubular conductor 62 provides diametrically opposed axially extending slots 64 diametrically aligned with the slots 56 and breaking circumferential electrical conduction of the tubular conductor 62 at the region of the slots 64. The tubular conductor 62 may be a machined metal tube or may be a plated metal layer on the dielectric material 60. As with the slots 56, the volume within the slots 64 may be filled with a dielectric matching the dielectric material 60; however, this material is generally not critical because of the small volume and thus other dielectrics may be used.

A sharpened tip 70 may be fit to the proximal end of the probe 22 to assist in insertion through tissue and the necessary electrical connections to the center conductor 50, and the conductors 54 and 62 may be made through the handle 30 shown in FIG. 1.

Figure 6:
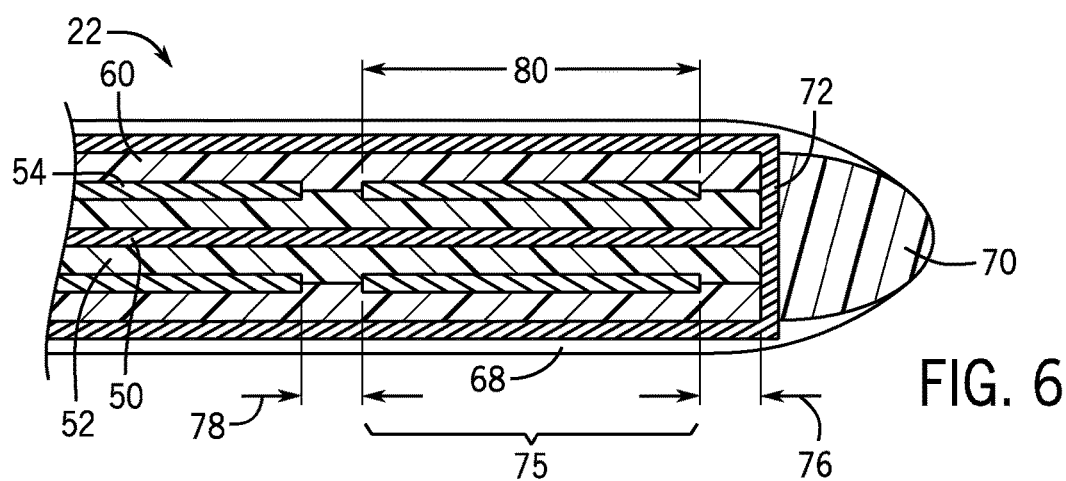
FIG. 6 is an elevation cross-section showing proximal and distal gaps separating the second conductor from an end plate and from a proximal remainder of the second conductor.

Referring now to FIGS. 5 and 6, the proximal end of the probe 22 may provide for a radially extending conductive end plate 72, for example, proximally to the tip 70 and electrically joining the center conductor 50 with the outer conductor 62. In this way the portions of the outer conductor 62 separated by the slots 64 are electrically continuous. A distal portion 75 of the conductor 54 is separated from the end plate 72 by a first gap 76 and separated from a proximal portion of the conductor 54 by a second gap 78, a center gap to center gap separation 80 being approximately 1 cm. For this reason the two portions of the distal portion 75 of the conductor 54 are not electrically continuous.

Desirably, the relative permittivity (sometimes referred to as dielectric constant) of the second dielectric material 60 will be greater than the relative permittivity of the dielectric material 52 by at least 15%. The first dielectric material 52 may be, for example, PTFE with a relative permittivity of about 2.1, and the second dielectric material 60 may be polyamide with the relative permittivity of 3-4. Alternatively, the second dielectric material 60 may be alumina or zirconia, etc. In this former case, the gap 78 may be, in one nonlimiting example, 4.1 mm and the gap 76 may be 3.5 mm with a separation 80 of 11 mm. Generally these gaps 78 and 76 will be from 1 to 4 mm and the separation 80 will be from 10 to 12 mm. The first slots 56 may be subtended by an angle 82 with respect to the center conductor of 15°, and the second slots 64 may be subtended by an angle of 20°. Generally, the angle subtended by the slot 64 will be greater than the angle subtended by the slots 56.

The radial thickness of the dielectric material 52 and dielectric material 60 may be equal or may be adjusted to be different according to optimization with other parameters as will be discussed below. Generally, the slots 56 and slots 64 will be of equal axial length.

Generally, the proximal portion of the conductors 54 and the conductor 62 will be connected to a return or ground of the microwave generator 38. In this regard these proximal portions may be connected together to communicate with the microwave generator 38 through the shield of a standard coaxial cable.

A biocompatible coating, for example, a polymer 68 such as PTFE or PEEK may then be applied around the outer surface of the conductor 62.

It is contemplated that the probe 22 may be used without cooling by using temperature feedback, power control, and the larger differential heating rates of coaxial cables and tissues at higher frequencies. Such advancements could permit less invasive antennas (−1 mm or smaller) with a lower risk profile. Alternatively, at least one of the dielectric materials 60 or 52 may include a circulated cooling fluid in addition to the dielectric material or as the dielectric material.

A given ablation may use a single probe 22 with power applied at one time or at several times with the probe 22 moved to different locations, or multiple probes 22 may be used simultaneously to obtain the desired ablation.

As used herein, a conductor will be considered a material that has a resistivity of no greater than stainless steel ($7 \times 10^{-7}$) ohm-meters including most metals. The dielectric materials 52 and 60 will exhibit properties of insulators at operating frequencies at the described frequencies absorbing less than 100th of the power dissipated by the probe 22.

It is specifically intended that the present invention not be limited to the embodiments and illustrations contained herein, but include modified forms of those embodiments including portions of the embodiments and combinations of elements of different embodiments as come within the scope of the following claims.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What I claim is:
1. A probe for microwave ablation comprising:
a first center conductor;
a second conductor spaced from and positioned around the first center conductor and including a first and second diametrically opposed slot extending parallel to the first center conductor;
a third conductor spaced from and positioned around the second conductor and including a third and fourth diametrically opposed slot extending parallel to the first center conductor, the third and fourth diametrically opposed slots radially aligned with the first and second diametrically opposed slots;
a first dielectric material providing a first relative permittivity in a volume between the first center conductor and the second conductor;

a second dielectric material providing a second relative permittivity different from the first relative permittivity in a volume between the second conductor and the third conductor; and wherein the probe produces a microwave emission pattern concentrated along a plane of the slots.

2. The probe of claim 1 wherein the first dielectric material has a relative permittivity of at least 15% less than the second dielectric.

3. The probe of claim 1 wherein a circumferential extent of the slots in the second conductor and third conductor and values of the relative permittivity of the first dielectric material and second dielectric material provide for a planar emission of microwave energy in surrounding tissue bounded by a height of less than 50% of a bounding width in the plane of the slots at an isocontour of 10% of an electric field intensity maximum in the surrounding tissue.

4. The probe of claim 1 wherein the first, second, third, and fourth slots are limited in length to less than 2 centimeters.

5. The probe of claim 1 wherein the third conductor has an outside diameter of less than 8 mm.

6. The probe of claim 1 further including an electrically insulating handle attached to a distal end of the probe in supporting a flexible electrical cable providing an electrical connector for receiving microwave power.

7. The probe of claim 6 wherein a distal end of the probe includes a feature showing an orientation of the slots about a centerline of the probe.

8. The probe of claim 1 further including a microwave power supply providing a microwave frequency voltage between the center conductor and second and third conductors of greater than 2 GHZ and at least 10 W.

9. The probe of claim 1 wherein the first center conductor, second conductor, and third conductor are triaxially oriented conductors with circular cross-sections.

10. The probe of claim 1 further including a biocompatible coating surrounding the third conductor.

11. The probe of claim 1 including an end plate at a distal end of the probe connecting the first center conductor to the third conductor and including a first circumferential gap separating the end plate from a first distal portion of the second conductor and a second circumferential gap separating the first distal portion of the second conductor from a proximal portion of the second conductor.

12. A method of ablation employing a microwave probe having a first center conductor; a second conductor spaced from and positioned around the first center conductor and including a first and second diametrically opposed slot extending parallel to the first center conductor; a third conductor spaced from and positioned around the second conductor and including a third and fourth diametrically opposed slot extending parallel to the first center conductor, the third and fourth diametrically opposed slots radially aligned with the first and second diametrically opposed slots; a first dielectric material providing a first relative permittivity in a volume between the first center conductor and second conductor; and a second dielectric material providing a second relative permittivity different from the first relative permittivity in a volume between the second conductor and the third conductor, the method comprising:

(a) inserting the probe into material to be ablated and aligning the slots with a desired ablation plane; and (b) applying a gigahertz microwave frequency signal between the first center conductor and second and third conductors to ablate the material primarily along the desired ablation plane.

13. The method of claim 12, wherein the material is biological tissue.

14. The method of claim 12, wherein the material is a bone and the ablation plane is aligned with a bone growth plate.

15. The method of claim 12, wherein the gigahertz microwave frequency signal applies a voltage between the center conductor and second and third conductors of greater than 2 GHz and at least 10 W.

* * * * *